G. H. LEWIS.
AUTOMATIC CUTTING AND BEVELING APPARATUS.
APPLICATION FILED FEB. 27, 1917.
1,289,485.
Patented Dec. 31, 1918.
2 SHEETS—SHEET 1.
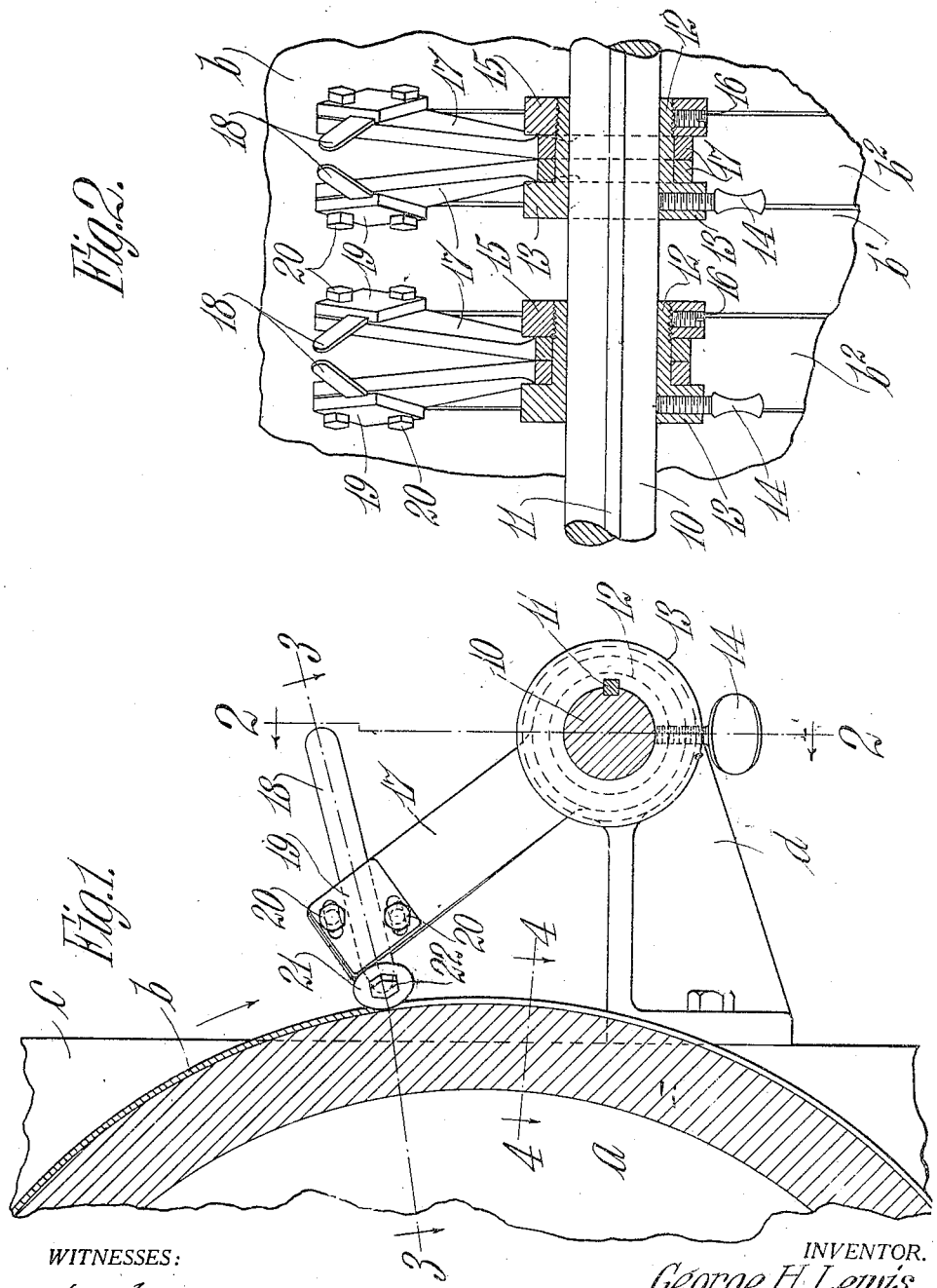
WITNESSES:
INVENTOR.
George H. Lewis.
BY
ATTORNEYS.

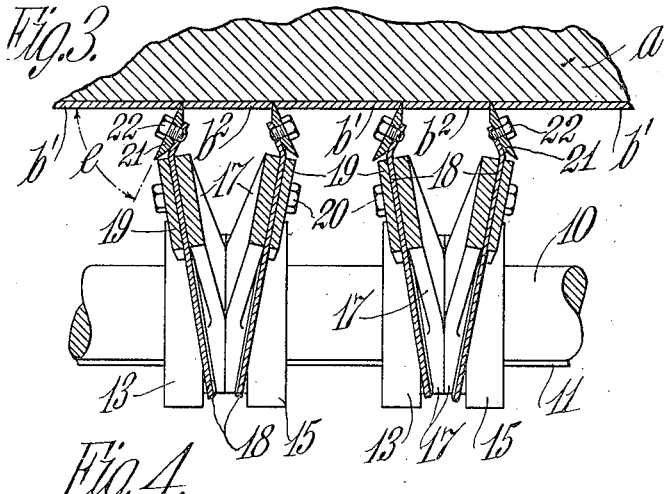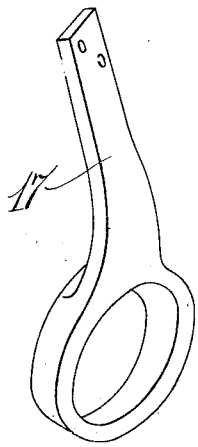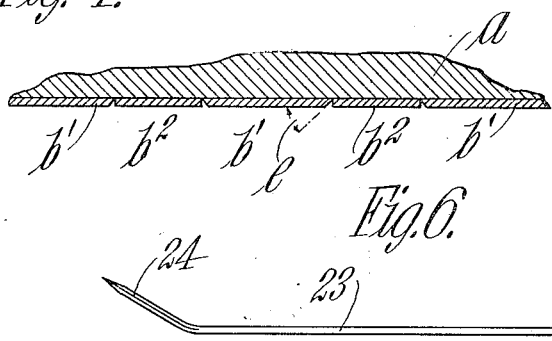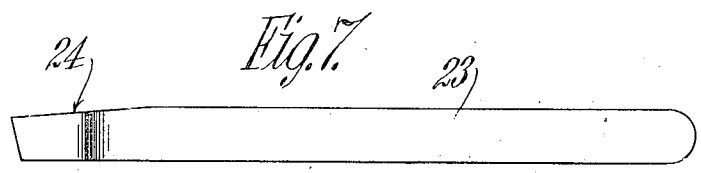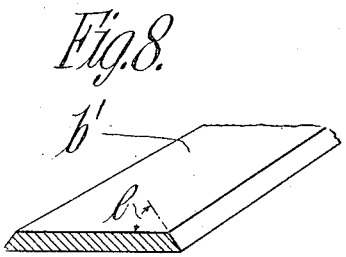

UNITED STATES PATENT OFFICE.

GEORGE H. LEWIS, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

AUTOMATIC CUTTING AND BEVELING APPARATUS.

1,289,485.　　　　　　Specification of Letters Patent.　　Patented Dec. 31, 1918.

Application filed February 27, 1917. Serial No. 151,360.

*To all whom it may concern:*

Be it known that I, GEORGE H. LEWIS, a citizen of the United States of America, residing at Chicopee Falls, in the county of Hampden and State of Massachusetts, have invented certain new and useful Improvements in Automatic Cutting and Beveling Apparatus, of which the following is a specification.

This invention relates to cutting devices for forming and beveling strips from calenders, for example, and more particularly to devices of this character which operate not only to slit a web into a plurality of strips during a calendering operation, but at the same time bevel the edges of the strips.

The invention may be applied generally wherever it is desired to sub-divide a web into a plurality of ribbon-like strips having beveled edges. An example of one specific use to which the invention may be put is found in the rubber tire making art. Here, it is frequently desirable to build up the tread portion of the shoe with a circumferentially disposed strip of rubber stock to obtain an increased thickness over the remaining portions of the shoe. Particularly, these strips are so used when the tread portion of the shoe is required to be of different material or of a different color than the material used for the body of the tire. In using such strips in the formation of a tire shoe, the edges are preferably beveled so as to gradually taper down into a thin edge to meet the body of the shoe.

Heretofore, rubber stock, rolled out by the calenders into a web, has been automatically slit into strips, but the beveling has been done by hand. Hand beveling requires the services of skilled operators, and the operation is slow and tedious and consequently expensive.

This invention has for its main object to provide means for automatically beveling the strips as they are slit from the web.

Another object of the invention is to provide a slitting and beveling attachment for calenders, comprising, a plurality of pivotally mounted cutting knives arranged in pairs and adapted to engage the web on the calender roll to slit it, the cutting edge of each pair of knives being oppositely turned to converge toward the web, whereby the portions of the web between adjacent knives of successive pairs are formed with beveled edges.

Another object of the invention is to provide a cutting attachment for calenders which includes a plurality of sleeves laterally adjustable on a support arranged parallel with the calender roll and a pair of cutting knives pivotally supported for independent movement on the sleeve and restrained from axial movement relative to the latter, the cutting edges of the knives of each pair being turned to converge inwardly toward the roll.

Other objects and advantages will appear in the following description and in the appended claim.

The invention, in a form at present preferred, is shown for illustrative purposes in the accompanying drawings in which—

Figure 1 is a cross sectional view showing the beveling attachment in working engagement with a calender roll;

Fig. 2 is a partial elevation taken on the line 2—2 of Fig. 1;

Fig. 3 is a sectional plan view taken on the line 3—3 of Fig. 1;

Fig. 4 is a sectional plan view on the line 4—4 of Fig. 1;

Fig. 5 is a perspective view of a knife holding arm;

Figs. 6 and 7 are plan and elevational views, respectively, of a modification in the knife blade; and Fig. 8 is a perspective view of a strip formed by the beveling attachment.

Referring to these drawings in detail, *a* represents a portion of a calender roll, and *b* is a web of material, such as rubber stock, for example, which has been rolled out between other calender rolls (not shown) and is about to leave the calender from the lower peripheral portion of roll *a*. The latter is suitably journaled in a pair of spaced side frames *c* (one only being shown in Fig. 1) in the usual and now well-known manner. Attached to frames *c* are two spaced brackets *d* (one only of which is shown) and fixed in and extending between the brackets is a rod 10 which in the embodiment illustrated is of round cross-sectional shape. A key 11 is fixed in rod 10, as shown in Figs. 1 and 2, and slidable on the rod and held from rotative movement by key 11 are a plurality of sleeves 12. Each sleeve 12 has at one end a flanged head 13 and threaded into the latter is a thumb-screw 14 by means of which the sleeve may be held in its various positions of adjustment on rod 10. The other end of sleeve 12 is threaded (see Fig. 2) to receive an interiorly threaded collar 15 which may be fixed in the desired axial position on the sleeve by a set screw 16.

Loosely mounted on each sleeve 12 and held against axial displacement by head 13 and collar 15 are a pair of arms 17 which are bent into substantially the shape shown in Fig. 5. As shown in Fig. 2, the two arms 17 on each sleeve 12 are bent in opposite directions to diverge outwardly from the sleeve. Furthermore, the upper ends of the two arms of a pair are twisted, as shown in Fig. 3, so that the adjacent faces thereof are arranged in diverging relation with respect to roll $a$. Fixed to the outer face of each arm adjacent its upper end is a blade 18 which is clamped to the arm by a strap plate 19 and bolts 20.

Referring to Figs. 1 and 3, the ends of the two blades 18 of each pair are bent inwardly toward one another so that they converge toward roll $a$. A circular knife 21 is clamped to the outer face of each blade 18 near the end thereof by a stud 22 threaded into the blade. The knives 21 are not intended to rotate on stud 20 but, as shown, are so mounted as to permit rotative adjustment thereon from time to time to present new cutting edges to roll $a$. Although the circular knife is preferred on account of its adjustability and consequently increased period of use available before sharpening is required, it is not essential that this form of knife be employed. Other knives may be used as desired. For example, a straight blade 23 (see Figs. 6 and 7) may be substituted for the blade 18 and mounted in a similar manner on arm 17. The end of this blade is ground to a knife edge as indicated at 24 and bent at an angle to the blade, as best shown in Fig. 6.

In the embodiment of the invention illustrated, the radial distance from the cutting edge of each knife to the center of rod 10 is made greater than the shortest distance from the center of the rod to the periphery of roll $a$. By this arrangement, each knife may be forced toward the roll by the action of gravity, and, as the roll $a$ is rotatable in the direction of the arrow shown in Fig. 1, the pressure of the knives on the roll is increased by the dragging action of the web $b$. The described means for forcing the knives against roll $a$ is not, however, an essential feature of this invention, and other means may be employed as desired, such as the means disclosed in my copending application Serial No. 1,151,359 filed Feb. 27, 1917, for example, or any other suitable means. The arrangement herein disclosed is, however, of particular advantage in that no springs or like devices are necessary to obtain the desired knife pressure. Consequently, each knife may be quickly and conveniently brought into or removed from operative engagement with roll $a$. When a knife is to be taken out of action, for example, its arm 17 is swung in a clockwise direction (as viewed in Fig. 1) away from the roll and is held by gravity in an inoperative position, depending substantially vertically from rod 10.

It will be noted from Fig. 3 that the adjacent cutting edges of each pair of knives 21 are substantially normal to roll $a$ while the other faces are at an angle $e$ to the roll. Thus, as the latter rotates, the web $b$ is slit into a plurality of strips $b'$ and $b^2$ by cuts of the shape shown in Fig. 4. The strips $b'$ are formed between the adjacent knives of successive pairs of knives, as shown in Fig. 3, with the result that the edges of the strip are oppositely beveled at an angle $e$ to the face of the strip. The finished strip $b'$ is shown in Fig. 8. The strips $b^2$, formed between the two knives of a pair, have substantially square edges and are not utilized as a product of the machine. The strips $b^2$, after being removed from roll $a$, are thrown into the calender rolls along with other rubber stock to aid in the production of web $b$ so that these strips are not a material waste. They are, however, made as narrow in width as possible to increase the output of a calender of given width.

The width of strips $b^2$ is increased by offsetting arms 17, as described, but the peculiar shape of the latter is resorted to in order that the adjacent knives of successive pairs of knives may be brought into close relation, and this is the important criterion to which the width of strips $b^2$ is subordinate. It will be seen that, due to the bending of arms 17 in the described manner, the adjacent knives on adjacent sleeves 12 may be brought together until the rear edges of the knives almost touch so that strips of very narrow width may be formed.

The structure herein described is characterized by accomplishing automatically, by relatively simple means, the slitting of a web of rubber stock into strips and the simultaneous beveling of the edges of the strips accurately and uniformly at a predetermined angle. The knives act upon a continuous web immediately after it has been drawn out to the desired thickness, so that starting with raw material at one end of the calender, the output of the latter is in finished form ready to apply in the formation of a tire shoe, and this is accomplished automatically and expeditiously in an efficient manner, as against the slow and expensive manner heretofore employed. Furthermore, skilled labor is not essential to the operation of the machine, and, the knives having once been adjusted, the machine may be successfully run by unskilled operators.

Thus, an efficient, slitting, and beveling device has been provided which is adapted for use with calenders to form from a continuous web a series of strips, the edges of which are beveled in an accurate and uniform manner. The invention has been described in a preferred form for illustrative purposes, but the scope of the invention is defined by the appended claim rather than by the foregoing description.

What I claim is—

The combination in a machine for calendering webs of rubber and the like, of a roll over which the web is passed, a rod mounted in parallel and adjacent relation with said roll, a series of members mounted for axial adjustment on the rod, and a plurality of cutting knives to engage the web on said roll, said knives being arranged in pairs and each pair being mounted in constantly spaced relation and for independent pivotal movement on a member, the cutting edges of the knives of each pair being so turned as to converge toward said roll, whereby a plurality of strips of variable width and having oppositely beveled edges may be formed between the adjacent knives of successive pairs and the strips formed between the knives of each pair may be maintained of constant width.

GEORGE H. LEWIS.